US008428772B2

(12) United States Patent
Miette et al.

(10) Patent No.: US 8,428,772 B2
(45) Date of Patent: Apr. 23, 2013

(54) METHOD OF PROCESSING MAILPIECES USING CUSTOMER CODES ASSOCIATED WITH DIGITAL FINGERPRINTS

(75) Inventors: Emmanuel Miette, Saint Gratien (FR); Christophe Lhomme, Paris (FR)

(73) Assignee: Solystic, Gentilly Cedex (FR)

( * ) Notice: Subject to any disclaimer, the term of this patent is extended or adjusted under 35 U.S.C. 154(b) by 527 days.

(21) Appl. No.: 12/299,845

(22) PCT Filed: Aug. 12, 2008

(86) PCT No.: PCT/FR2008/051491
§ 371 (c)(1),
(2), (4) Date: Nov. 6, 2008

(87) PCT Pub. No.: WO2009/030853
PCT Pub. Date: Mar. 12, 2009

(65) Prior Publication Data
US 2010/0174406 A1 Jul. 8, 2010

(30) Foreign Application Priority Data

Sep. 7, 2007 (FR) ..................................... 07 57402

(51) Int. Cl.
*B07C 1/00* (2006.01)
(52) U.S. Cl.
USPC ........... 700/229; 209/534; 209/584; 235/375; 700/224
(58) Field of Classification Search .......... 700/223–225, 700/229
See application file for complete search history.

(56) References Cited

U.S. PATENT DOCUMENTS

| | | | | |
|---|---|---|---|---|
| 4,058,217 A * | 11/1977 | Vaughan et al. | ............... | 209/559 |
| 5,910,998 A * | 6/1999 | Yui | ............................... | 382/101 |
| 6,279,750 B1 * | 8/2001 | Lohmann | ...................... | 209/559 |
| 6,697,500 B2 * | 2/2004 | Woolston et al. | ............. | 382/101 |
| 6,826,446 B1 * | 11/2004 | Volta | ............................. | 700/224 |
| 6,888,084 B1 * | 5/2005 | Bayer | ........................... | 209/584 |
| 7,069,253 B2 * | 6/2006 | Leon | ........................... | 705/408 |
| 7,413,114 B2 * | 8/2008 | Miette et al. | ................... | 235/375 |
| 7,674,995 B2 * | 3/2010 | Desprez et al. | ............. | 209/584 |
| 8,086,346 B2 * | 12/2011 | Kiani et al. | ................... | 700/224 |
| 8,126,204 B2 * | 2/2012 | Desprez | ....................... | 382/101 |

(Continued)

FOREIGN PATENT DOCUMENTS

FR 2 807 348 A1 10/2001
FR 2 841 673 A1 1/2004

*Primary Examiner* — Gene Crawford
*Assistant Examiner* — Kyle Logan
(74) *Attorney, Agent, or Firm* — Rothwell, Figg, Ernst & Manbeck, P.C.

(57) ABSTRACT

In a method of processing mailpieces, Customer Applied Identifier (CAI) codes are assigned to the mailpieces by a sender of the mailpieces, and are used by the postal operator while the mailpieces are passing through a postal sorting system. Said CAI codes are recorded in memory in the sorting system in correspondence with first digital fingerprints or image signatures prior to the first pass of the mailpieces through the postal sorting system. While a current mailpiece is passing through the sorting system in a first sorting pass, an image is formed of the surface of the mailpiece that bears a postal address block, and a current fingerprint and location information for locating said mailpiece in the sorting process is derived from the image of said mailpiece. A search is made for a match between said current fingerprint and a first fingerprint recorded in memory in order to retrieve a current CAI code with which said location information is.

2 Claims, 4 Drawing Sheets

U.S. PATENT DOCUMENTS

| | | | |
|---|---|---|---|
| 8,311,667 B2* | 11/2012 | Kiani et al. | 700/224 |
| 2003/0089643 A1* | 5/2003 | Forella et al. | 209/584 |
| 2004/0005081 A1* | 1/2004 | Arcas-Luque et al. | 382/101 |
| 2005/0269395 A1* | 12/2005 | Miette et al. | 235/375 |
| 2006/0271236 A1* | 11/2006 | Rosen et al. | 700/221 |
| 2007/0000818 A1* | 1/2007 | Delitz et al. | 209/534 |
| 2007/0239313 A1* | 10/2007 | Goyal et al. | 700/224 |
| 2008/0110808 A1* | 5/2008 | Takahashi | 209/547 |
| 2008/0149540 A1* | 6/2008 | Olivier et al. | 209/584 |

* cited by examiner

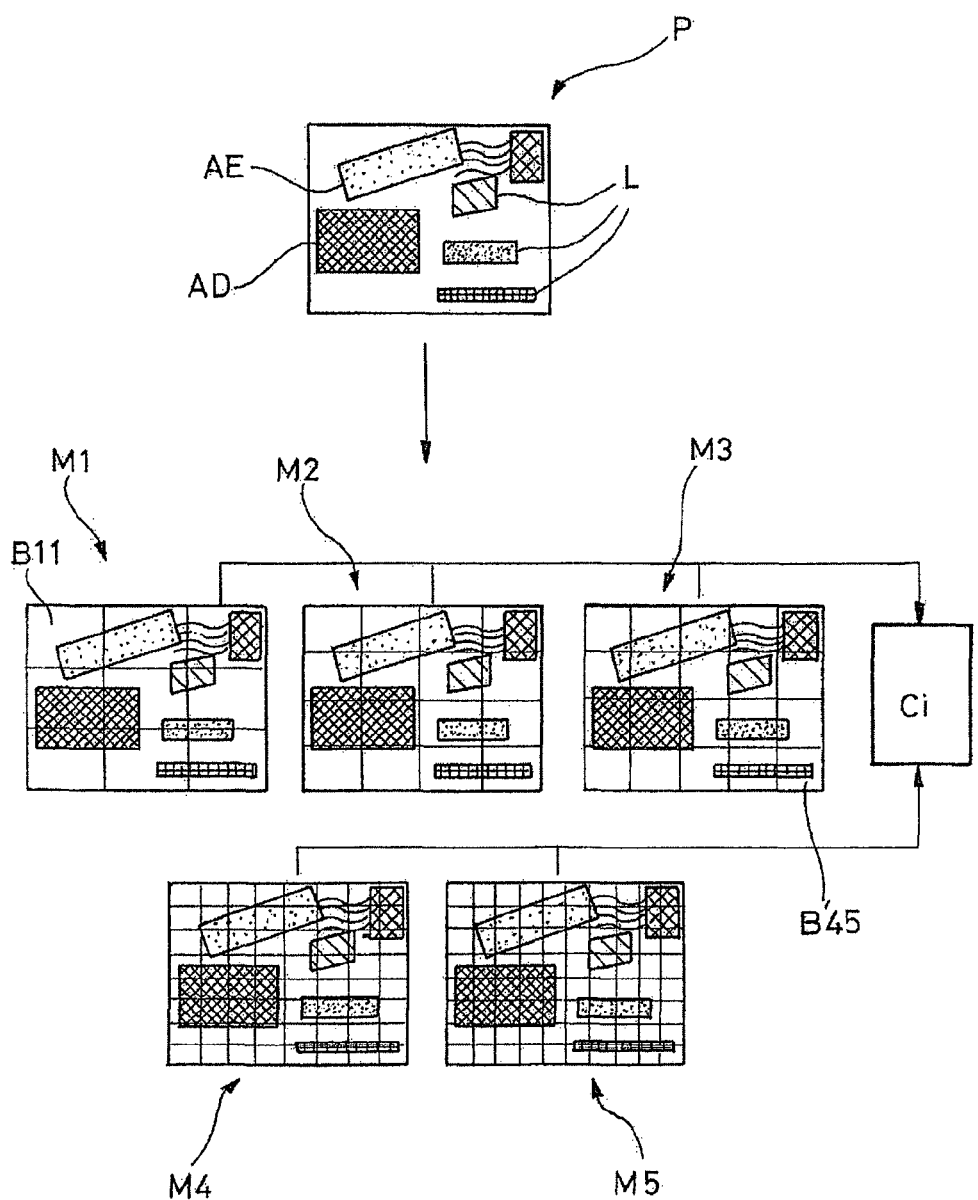
FIG_1

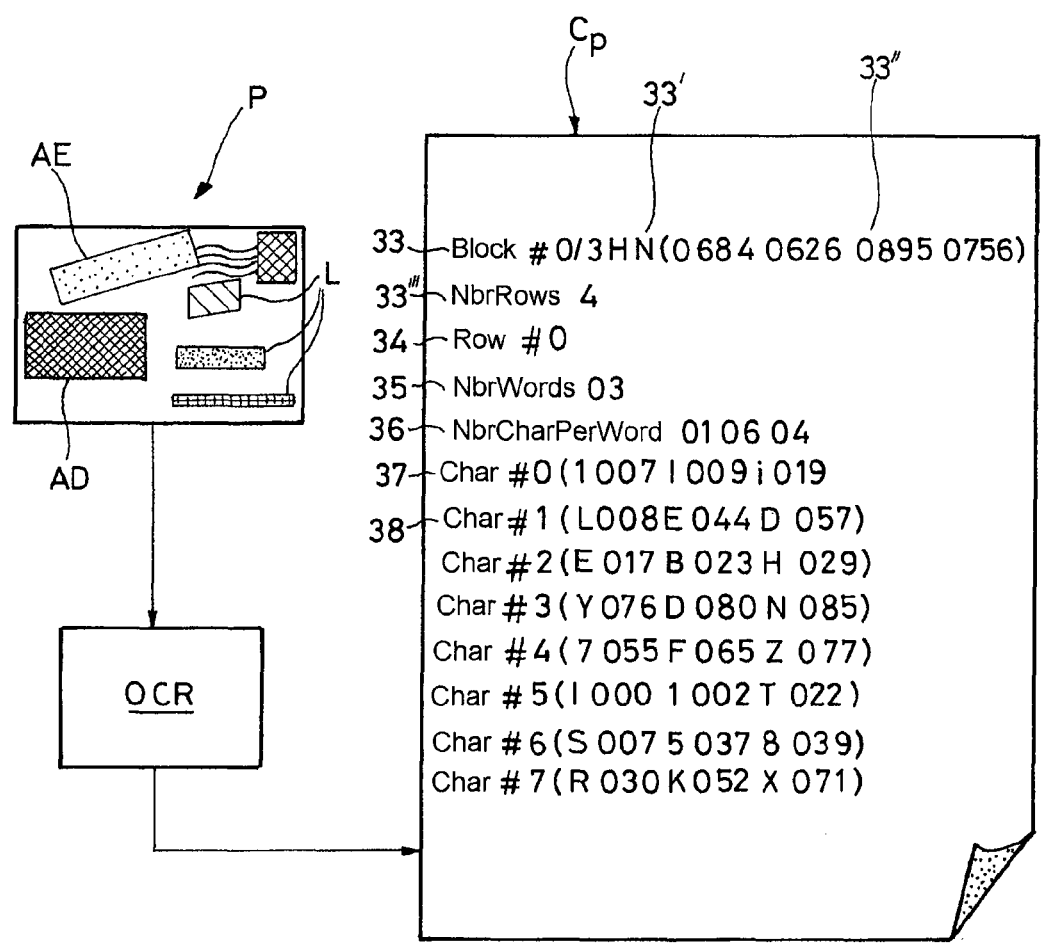
FIG_2

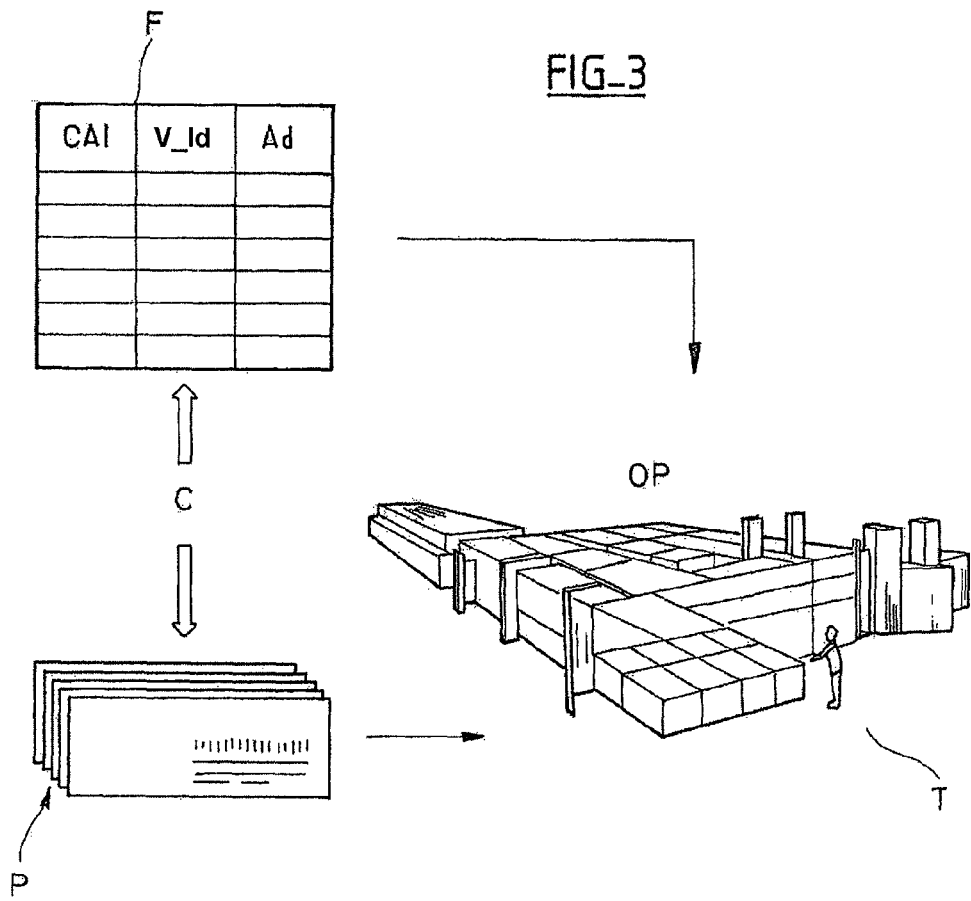
FIG_3
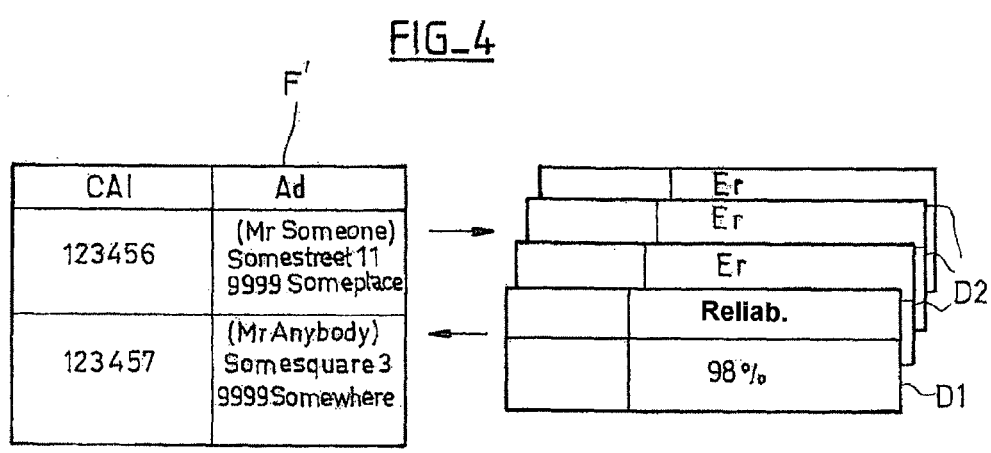
FIG_4

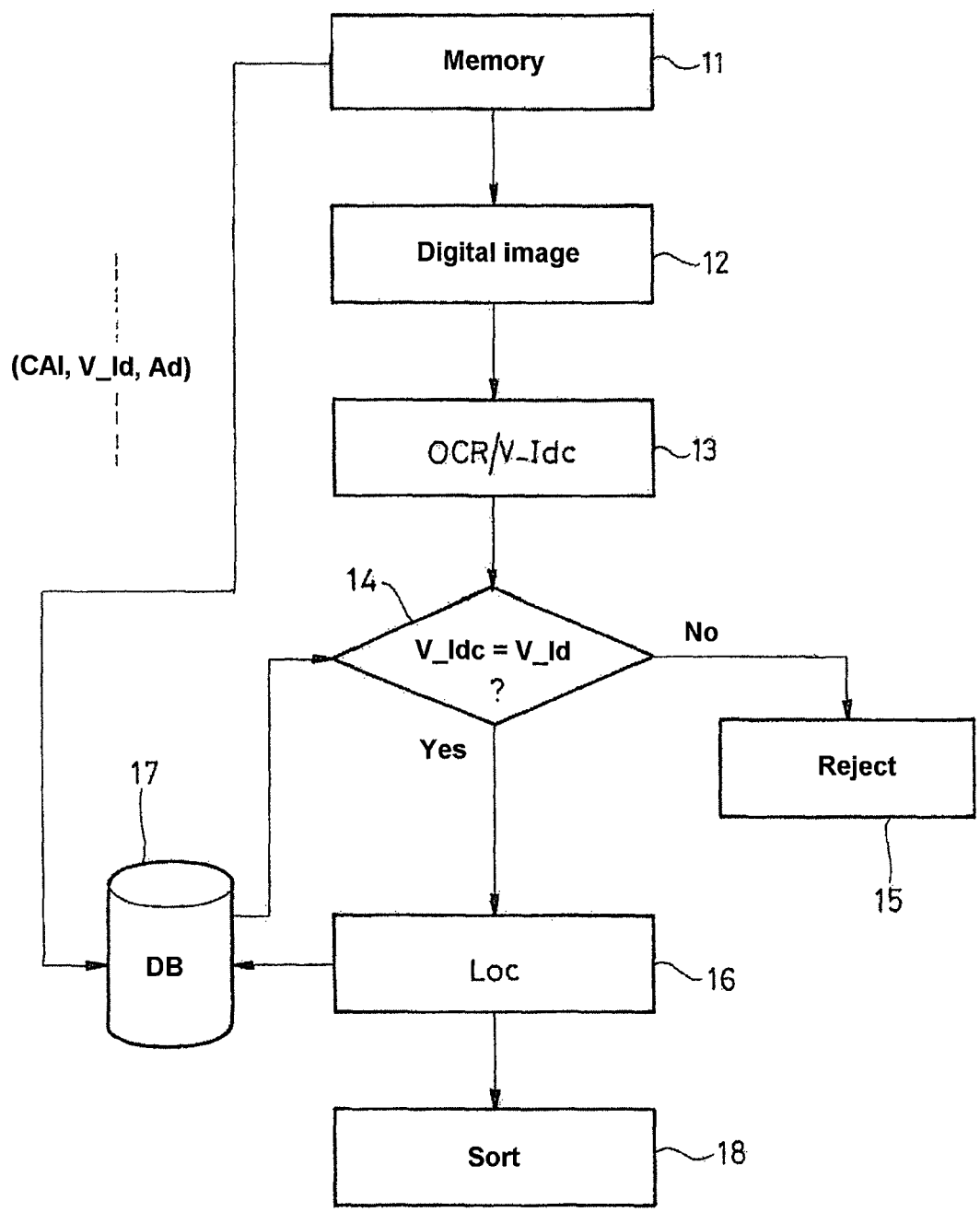
FIG_5

METHOD OF PROCESSING MAILPIECES USING CUSTOMER CODES ASSOCIATED WITH DIGITAL FINGERPRINTS

CROSS-REFERENCE TO RELATED APPLICATIONS

This application is a 35 U.S.C. §371 National Phase Application from PCT/FR2008/051491, filed Aug. 12, 2008, and designating the United States, which claims the benefit of France Patent Application No. 0757402, filed Sep. 7, 2007.

BACKGROUND OF THE INVENTION

1. Field of the Invention

The invention relates to a method of processing mailpieces, in which method Customer Applied Identifier (CAI) codes are assigned to the mailpieces by a sender of the mailpieces, and, while the mailpieces are passing through a postal operator's postal sorting system, a current CAI code is retrieved from each current mailpiece, and said current CAI code is associated with location information for remotely tracking the current mailpiece in the sorting process.

2. Discussion of the Background Art

Such a method is already known from Patent Document FR-2 807 348. That known method makes it possible for a bulk sender or "bulk mailer" to obtain a service for tracking and locating mailpieces in real time. The use of CAI codes also makes it possible for the sender to improve its databases of addresses of the recipients of the mailpieces. For the postal operator, this results in a reduction in the costs of delivering the mailpieces because there are fewer upsets and errors in the automatic sorting of the mailpieces.

Until now, CAI codes have been printed by the sender on the mailpieces in the form of barcodes, in particular code 128 barcodes. For example, the CAI code can be printed by the sender at the same time as the recipient address block is being printed on the envelope.

Such specific barcodes printed for mailpiece tracking purposes can be sources of confusion when reading the address information on the surfaces of the mailpieces.

SUMMARY OF THE INVENTION

An object of the invention is to provide a solution to those problems. To this end, the invention provides a method as defined above, characterized in that said CAI codes are recorded in memory in the sorting system in correspondence with first digital fingerprints or image signatures of the surfaces of the mailpieces prior to the first pass of the mailpieces through the postal sorting system, and in that, while a current mailpiece is passing through the sorting system in a first sorting pass, an image is formed of the surface of the mailpiece that bears a postal address block, a current fingerprint is derived from the image, and a search is made for a match between said current fingerprint and a fingerprint recorded in memory in order to retrieve the current CAI code by association.

With the method of the invention, it is thus no longer necessary to print or to read CAI codes in the form of barcodes on the surfaces of the mailpieces. Generating digital fingerprints for mailpieces is described in French Patent Document FR-2 841 673. Each digital fingerprint comprises a first component or "image component" representative of physical characteristics of the digital image of the corresponding mailpiece and a second component or "postal component" indicating at least one spatial position of the information blocks present in the image of the mailpiece. In particular, the image component is formed by "global" attributes that are representative of overall physical characteristics taken from the entire set of picture elements (pixels) of the digital image of the mailpiece. The image component is also formed of second attributes or "local" attributes that are representative of local physical characteristics taken from distinct portions of a grid applied over the image of the mailpiece (or of a plurality of different grids). In practice, when searching for a match between a current fingerprint and a first candidate fingerprint recorded in memory, firstly the respective image components of the fingerprints are compared and then the respective postal components of the fingerprints are compared. It is possible to use mechanisms for reducing the exploration space by predicting sequences of mailpieces so as to detect a match more quickly. Such a mechanism is, for example, described in Patent Document FR-2 883 493.

The method of the invention for processing mailpieces may present the following features:

said first fingerprints are generated in the postal sorting system on the basis of mailpiece images recorded in memory in correspondence with said CAI codes; and said first fingerprints are generated on the basis of an image that is characteristic of the mailpieces and on the basis of postal address information.

BRIEF DESCRIPTION OF THE DRAWINGS

An implementation of the method of the invention is described in more detail below with reference to the drawings. This description is given merely by way of example, the example being given by way of indication and in no way limiting the invention. In the drawings:

FIG. 1 is a highly diagrammatic view of how the image component of a fingerprint is generated;

FIG. 2 is a highly diagrammatic view of how the postal component of a fingerprint is generated;

FIG. 3 is a highly diagrammatic view of the principle of the method of the invention;

FIG. 4 is a highly diagrammatic view of a portion of the method of the invention; and FIG. 5 is a highly diagrammatic view in the form of a flow chart showing how the method of the invention proceeds on a postal operator's site.

DETAILED DESCRIPTION OF THE PREFERRED EMBODIMENTS

The method of the invention uses mailpiece identifiers in the form of digital fingerprints. A description follows of how a fingerprint is constructed from an image of the surface of a mailpiece and of how a search is made for a match between two fingerprints.

In accordance with the invention, the mailpieces may be letters, flat articles of small format or of large format ("flats") having paper envelopes or wrappers made of a plastics material, and other articles to be sorted for postal delivery purposes.

Generating the Digital Fingerprints

FIG. 1 shows a mailpiece referenced P whose surface bears, for example, a first information block AD that corresponds to the postal delivery address or "recipient address", an information block AE that corresponds to a sender address, and an information block L that can take the form of a graphical logo that corresponds to other additional textual information such as an advertising slogan printed by the sender.

On the basis of a low-resolution gray-scale digital image of said surface of the mailpiece, a first component or "image component" $C_i$ of the fingerprint is generated, which component comprises "global attributes" and "local attributes". The global attributes are more particularly representative of overall physical characteristics of the image, such as height and width of the mailpiece, mean luminance of the pixels of the digital image, standard deviation, and entropy of the luminance values. The local attributes are more particularly representative of local physical characteristics of the image that are taken from distinct portions of the digital image.

In FIG. 1, the digital image of the mailpiece P is subdivided into a plurality of distinct portions B11, B'45 resulting from various grids M1, M2, M3, M4, M5 being applied over the digital image. The grid M1 defines 3×3 distinct portions in this example. The grid M5 defines 8×10 distinct portions. The number of distinct portions in a grid and the number of grids can be a parameter in the statistical analysis applied to the digital image for the purpose of extracting the image component $C_i$ of the fingerprint. On the basis of each portion such as B11 and B'45 of the digital image resulting from a grid such as M1 or M3 being applied, it is possible to extract local attributes such as the mean luminance value of the pixels in this portion of the digital image, the standard deviation, and the entropy of the luminance values in this portion of the digital image. These local attributes contain discriminatory information, and the more varied the mailpieces, the more discriminatory the information.

FIG. 2 shows a second component or "postal component" $C_p$ of the fingerprint that indicates at least the spatial positions of the information blocks such as AD, AE and L in the image of the mailpiece. An Optical Character Recognition (OCR) system conventionally used in a postal sorting machine is capable of delivering data indicating the spatial positions of blocks of textual information detected in the digital image. Such position-indicating data can be constituted by the spatial and angular positioning coordinates of the rectangular zone forming each information block. An OCR system is also suitable for delivering a textual description of each information block detected in the digital image. For example, a textual description of an information block such as AD can consist in an indication of the number of rows of characters detected in the information block, the number of words detected in each row of characters, or the number of characters detected in each word of each row of characters.

FIG. 2 shows an example of a textual description of the information block AD constituting the postal component $C_p$ of the fingerprint of a mailpiece:

"BLOCK #0/3", designated by 33, references information block 0 from among the three information blocks detected in the digital image;

"HN", designated by 33', is data indicating the angular positioning of information block 0 in the digital image;

"(0684 0626 0895 0756)" designated by 33" are data items representative of the spatial co-ordinates of information block 0 in the digital image;

"NbrRows 4", designated by 33''', indicates that the information block 0 contains four rows of characters;

"Row #0", designated by 34, references the first row of characters detected in information block 0;

"NbrWords 03", designated by 35, is data indicating that three words have been detected in the first row of characters;

"NbrCharPerWord 01 06 04", designated by 36, are data items indicating that the three words of the first row of characters contain 1, 6, and 4 characters, respectively;

"char #0 (1 007 l 009 i 019)", designated by 37, are data items indicating that, for the first character of the first row of characters, the OCR has identified three candidate characters, respectively 1, l, and i, with respective resemblance distances of 007, 009, and 019;

"char #1 (L 008 E 009 D 057)", designated by 38, are data items indicating that for the second character of the first row of characters, the OCR has identified three candidate characters, respectively L, E, and D, with respective resemblance distances of 008, 009, and 057;

and so on for the other characters of the first row of characters, given that a value 0 for the resemblance distance is the shortest distance, i.e. it represents the smallest departure from the ideal character.

Constructing a fingerprint thus stems from the idea that a digital image of a mailpiece is an interpretable two-dimensional signal whose contents can be understood both physically and symbolically. Because of this, a fingerprint is made up of two complementary components $C_i$ and $C_p$ that are not mutually correlated (i.e. that are independent from each other).

Searching for a Match Between Two Fingerprints

In order to compare a current fingerprint with a candidate fingerprint recorded in a database, the image component $C_i$ of the current fingerprint is compared with the image component $C_i$ of the candidate fingerprint, and the postal component $C_p$ of the current fingerprint is also compared with the postal component $C_p$ of the candidate fingerprint. Since the candidate fingerprint is part of a larger set of fingerprints, prior coarse filtering is performed in order to reduce the exploration space.

It is possible to begin with a comparison of the respective global attributes of the image components, which comparison includes thresholding of the absolute values of the variations over each global attribute so as to perform initial filtering from among the candidate fingerprints recorded in the database. This filtering makes it possible to eliminate the fingerprints that are very dissimilar from the current fingerprint, and to retain a small number of candidate fingerprints only for continuing the comparison.

Then the local attributes of the image components of said candidate fingerprints are compared, which comparison can further reduce the number of candidate fingerprints in the database. This comparison can be based firstly on computing a moving normalized correlation coefficient between the corresponding histograms in the current fingerprint and in the respective candidate fingerprints, thereby making it possible to be unaffected by any variations in luminance between the two digital images being compared, and then on computing a normalized correlation coefficient per type of attribute, between the other local attributes in the current fingerprint and in the respective candidate fingerprints, thereby making it possible to be unaffected by problems of normalization due to the difference in variability of each local attribute. The candidate fingerprints are then sorted in decreasing order of resemblance on the basis of the correlation coefficients, and a fixed number of most similar candidate fingerprints are retained.

Comparison between the postal components $C_p$ of the fingerprints can then begin by measuring the resemblance of the data indicating the positions of the information blocks so as to reduce the number of candidate fingerprints further. These candidate fingerprints can then be sorted in decreasing order on the basis of a measurement of resemblance between the textual descriptions of the information blocks. A match is detected on the basis of the resemblance measurement that is the highest.

Customer Mailpiece Identification Codes—CAIs

In accordance with the invention, a bulk sender who is a customer of a postal operator assigns a CAI code to each of the mailpieces, thereby enabling said sender to obtain a kind of traceability for the mailpieces with the postal operator.

FIG. 3 shows a file F compiled by the sender C with recordings, each of which comprises a fingerprint V_Id and address information Ad, e.g. in correspondence with a CAI code. Each recording thus corresponds to a mailpiece P of the batch of mailpieces that the sender C is going to entrust to the postal operator OP for sorting and delivery. It is understood that, in order to form the digital fingerprints V_Id of the mailpieces, the sender has firstly used a camera to form an image of the surface of each mailpiece that bears the recipient address block, and has then derived a digital fingerprint from each digital image as explained above. Each fingerprint comprises an image component and a postal component.

Said file F is sent by the sender C to the postal operator OP in parallel with the batch of mailpieces P to be delivered. The contents of said file F are loaded into memory in the postal sorting machine T (the term "machine" being used herein to designate a postal sorting system of varied complexity and size). The address information Ad in each recording of the file typically corresponds to the postal delivery address AD that appears on the surface of a mailpiece.

The exactitude of this address information Ad can have been checked by the postal operator OP as shown in FIG. 4. In order to enable such checking to be performed, the sender C gives the postal operator OP a list F' of delivery addresses Ad in correspondence with CAI codes. In F', the CAI codes are represented by simple numbers such as 123456 and 123457, but the CAI codes can be more complex, and each of them can also include a code identifying the sender and a code identifying the postal operator. Examples of delivery addresses Ad are also shown. At the end of the checking, the postal operator OP can return to the sender C data D1 indicating, for example, the reliability of the file F' (for commercial discussion purposes) and also data D2 for updating the delivery addresses held by the sender. Such updates can take place in particular after forwarding has been applied to one or more initial delivery addresses. This stage for checking and updating the recipient addresses on the mailpieces that takes place at a site of the sender thus makes it possible to eliminate (or to reduce) addressing errors subsequently while the mailpieces are being sorted. The exchanges of information between the sender C and the postal operator OP can take place in electronic form via telecommunications networks.

FIG. 5 is a flow chart showing how the method of the invention is implemented at a site of the postal operator.

In step 11, the file F is received at the site of the postal operator OP and the list of triplets (CAI code, digital fingerprint V_Id, and address data Ad) is recorded in memory of the postal sorting system T in a database 17. Each item of address data Ad corresponds to a sorting code (not shown) designating a sorting outlet in the sorting machine T. The sorting codes are recorded in memory 17 in correspondence with the CAI codes.

In step 12, a first mailpiece P goes through the postal sorting machine in a first pass, a camera is used to form a digital image of its surface that bears address information (in particular the delivery address block). Said camera is the camera that serves in a conventional sorting machine for automatic postal address recognition by OCR.

In step 13, a current digital fingerprint V_Idc is derived from said image for the current mailpiece. This fingerprint or image signature comprises an image component and a postal component as indicated above.

In step 14, a search is made for a match between the current fingerprint V_Idc and the fingerprints V_Id recorded in memory 17 in the sorting machine. If a match is detected in step 14, the process is continued in step 16. In step 16, the sorting code associated with the current fingerprint V_Idc and the CAI code associated with said fingerprint are retrieved by association from the database 17. In memory 17, in correspondence with this CAI code, a location information field is filled in: sorting centre number; sorting machine number; and time at which the current mailpiece passed through the machine, etc. This location information can then be consulted remotely by the sender.

In step 18, the current mailpiece is directed to a sorting outlet corresponding to the sorting code retrieved in step 16.

If, in step 14, no match is detected, the mailpiece is directed, in step 15, to a reject outlet in the sorting machine.

Steps 12 to 18 are repeated for the successive current mailpieces of the batch of mailpieces of the sender.

In a variant, instead of sending the fingerprints V_Id in the file F, the sender can send therein the images of the surfaces of the mailpieces. On the basis of these images, the postal operator firstly, in step 11, generates the digital fingerprints V_Id for the mailpieces, and then records them in memory 17 of the postal sorting machine T.

In an additional variant, instead of sending the fingerprints V_Id in the file F, the sender can send therein a single image that is characteristic of the surfaces of the mailpieces. On the basis of this characteristic image and of the address information Ad (where applicable, of character fonts used for the address information), the postal operator firstly, in step 11, generates the digital fingerprints V_Id for the mailpieces, and then records them in memory 17 in the postal sorting machine T.

In the first implementation of the method, it is the sender who generates the fingerprints that are associated respectively with the CAI codes. In the variants of the method of the invention, it is the postal operator who generates said fingerprints.

With the method of the invention, in order to provide a traceability service for bulk senders, a postal operator no longer needs to re-read the CAI barcodes on the bulk mailpieces. For the postal operator, this contributes to obtaining a reduction in the cost of operating its sorting equipment in which the bulk mailpieces are processed.

The invention claimed is:

1. A method of processing mailpieces to which Customer Applied Identifier (CAI) codes have been assigned by a sender of the mailpieces to each mailpiece, and for which first fingerprint V_Id and address information Ad are known by the sender and compiled by the sender in correspondence with a CAI code and recorded by the sender in a file F, CAI codes being used for remotely tracking the mailpieces while the mailpieces are passing through a postal operator's postal sorting system, comprising the steps of:
   a) receiving, in parallel with a batch of mailpieces provided by the sender, CAI codes respectively assigned to said mailpieces by the sender and the file F, said CAI codes being not printed on the mailpieces,
   b) recording said CAI codes in memory in the sorting system in correspondence with first digital fingerprints or image signatures of the surfaces of the mailpieces prior to a first pass of the mailpieces through the postal sorting system,
   c) feeding the mailpieces into the postal sorting system in a first sorting pass, and further performing during said first sorting pass the steps of:

d) forming, for each current mailpiece passing through the postal sorting system, an image of the surface of the current mailpiece that bears a postal address block,
e) deriving a current fingerprint from the respective image,
f) searching in the memory for a match between said current fingerprint and a recorded first fingerprint,
g) upon detection of a match, retrieving from the memory the CAI code and address information Ad corresponding to the current mailpiece using the mailpiece first fingerprint V_id provided by the sender in file F in correspondence with said CAI codes prior to the first sorting pass, and
h) recording in the memory location information corresponding to the retrieved CAI code, the location information including postal sorting machine identification data and a time at which the current mailpiece passed through the postal sorting machine.

2. A method according to claim 1, in which each of said first fingerprints or image signatures is generated in the postal sorting system on the basis of an image that is characteristic of the respective mailpiece and on the basis of postal address information provided by the sender in a file prior to the first sorting pass.

\* \* \* \* \*